32-16. AU 355 EX
-21-75 XR RE28307

EXACT FARE SYSTEM

Original Filed March 19, 1970 9 Sheets-Sheet 1

INVENTORS
George G. Dominick, Rinaldo Sciacero,
George I. Wimpffen & Theodore Louis Kardos
by McDougall, Hersh & Scott Att'ys

EXACT FARE SYSTEM

Original Filed March 19, 1970 9 Sheets-Sheet 4

FIG. 21
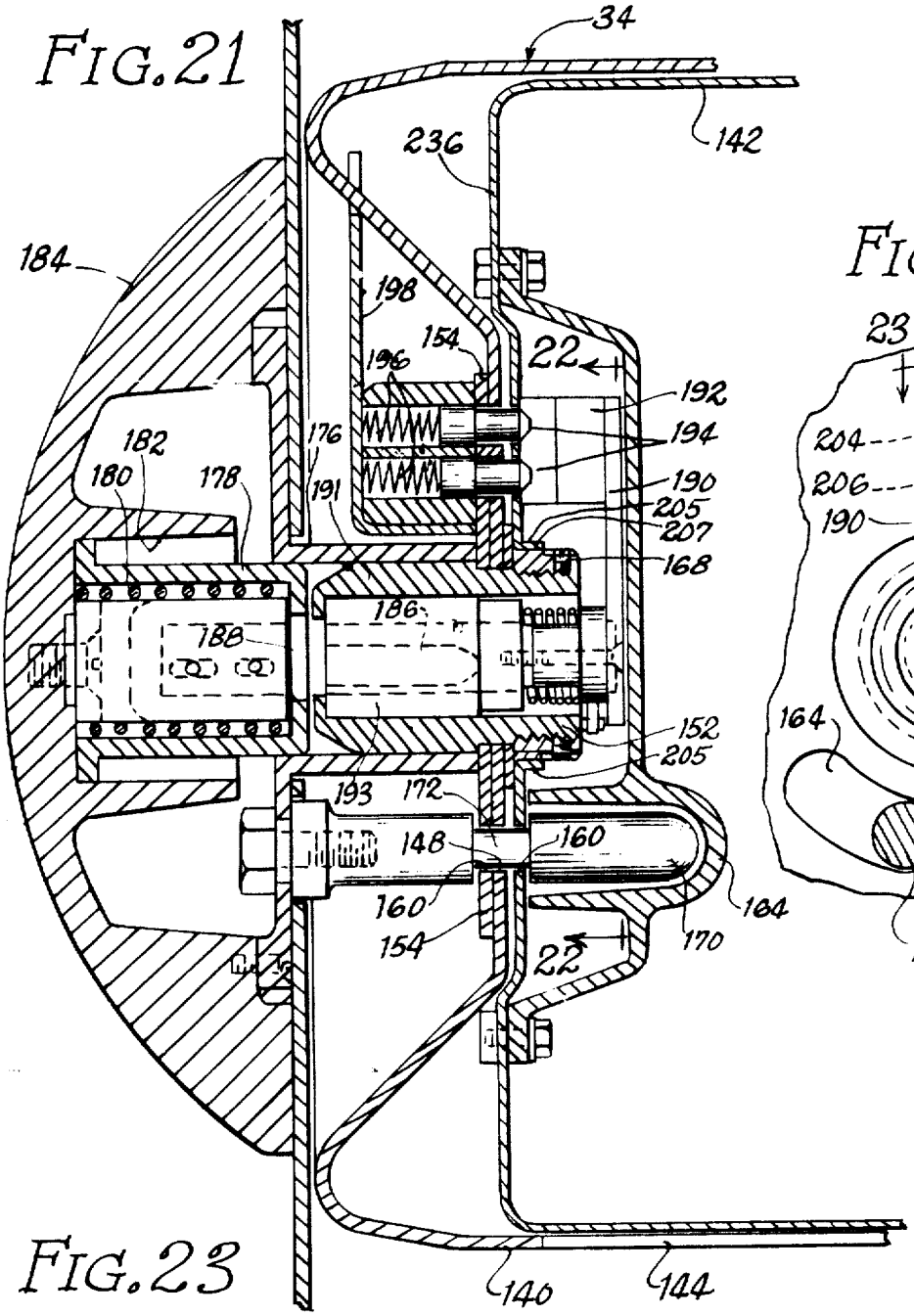
FIG. 22
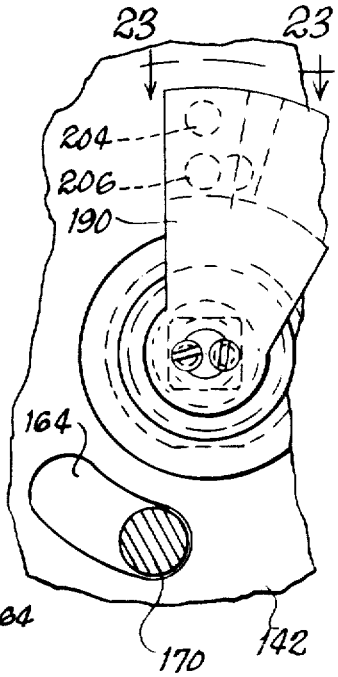
FIG. 23
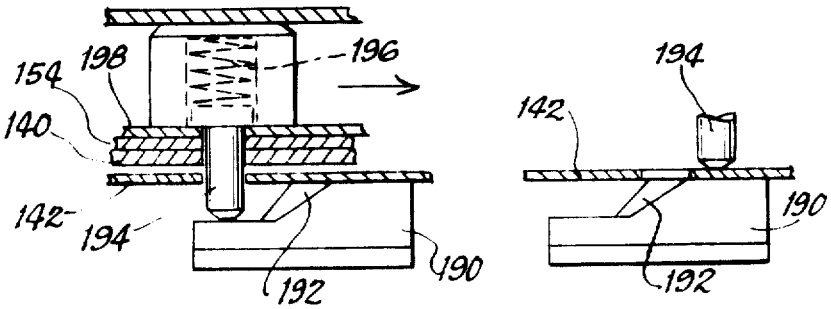
FIG. 24

United States Patent Office

Re. 28,307
Reissued Jan. 21, 1975

28,307
EXACT FARE SYSTEM

George G. Dominick, Hoffman Estates, Rinaldo Sciacero, Arlington Heights, George I. Wimpffen, Wheaton, and Theodore L. Kardos, Chicago, Ill., by Qonaar Corp., Elk Grove Village, Ill., assignee Original No. 3,670,955, dated June 20, 1972, Ser. No. 20,884, Mar. 19, 1970. Application for reissue Aug. 31, 1973, Ser. No. 393,430
Int. Cl. G07b *15/00*
U.S. Cl. 232—7 30 Claims

Matter enclosed in heavy brackets [ ] appears in the original patent but forms no part of this reissue specification; matter printed in italics indicates the additions made by reissue.

ABSTRACT OF THE DISCLOSURE

A construction for collecting exact fares comprising a housing having an inspection surface for temporarily holding fares deposited and manually operable means for dumping fares from said inspection surface into a cash box area. A removable cash box is received in a cash box receptacle, and closure means are provided in the cash box for blocking an access opening to normally prevent access to the interior of the cash box. Means are located in the receptacle to normally lock the closure means against movement relative to said access opening, and key means operate to unlock the closure means upon insertion of the cash box into the receptacle to thereby permit rotation of the cash box to locate the cash box in a position such that the access opening will receive fares dumped from the inspection surface. An interlock arrangement is included in the receptacle door to prevent tampering and pilfering. The total exact fare system includes a vault associated collecting means with security features to prevent pilfering after removal of the cash box from the cash box receptacle.

This invention relates to a system which is particularly designed for collecting fares, tolls, or other fees which are usually accepted in large numbers but in relatively small monetary amounts from the general public.

The invention will be described with reference to a fare collection system designed for public transportation systems. In such systems, a passenger is required to pay a fare upon entering a bus, streetcar or the like, by depositing the fare in a collection box.

It will be apparent when considering the following description that the general system has utility in a wide variety of other areas. Thus, problems similar to those that arise in the collection of fares also arise in the collection of tools, admissions, etc. The concepts to be described may be totally adopted for such other applications or individual features of the invention may be used alone in other applications or incorporated in other systems.

The collection of fares or similar payments has caused many problems. Handling problems have been recognized particularly in the case of large transit systems where fares from many individual vehicles are received. Standard systems require handling of the fares by the operator of the vehicle in transferring the fares from the collection receptacle to coin changers or money bags. Additional handling is then required in delivering the fares to some central collection point. All of this handling takes time and, therefore, leads to additional expense. The problem is compounded where the operator of the vehicle is required to make some written account of the collection which must in turn be recorded at the central collection area.

Aside from the inefficiencies which characterize present collection systems, there are extreme security problems. Thus, pilferage on the part of anyone handling funds collected is extremely difficult to prevent, and a wide variety of techniques have been developed for cheating existing fare collection systems. The techniques involve mechanical alterations of the fare box structures thereby avoiding recording of the fares by counting mechanisms associated with the fare boxes, for example, by including means which divert coins deposited. Where the operator is required to handle deposits, schemes are devised which result in improper recording of amounts collected.

Robbery also constitutes a very severe problem in any system requiring fare collection. A bus driver, for example, is extremely vulnerable to robbery since in a matter of seconds, a robber can enter the bus and take the driver's coin changer and money bags. Since buses operate at night—often in remote locations—it is virtually impossible to adequately protect against such occurrences.

Because of the various problems referred to, transit authorities have reverted to "exact fare" collections. In such a system, passengers deposit money in a collection box; however, the driver is not required to carry any change, and the money is never removed from the collection box by the driver. Accordingly, the passenger must have the exact fare in his possession or must deposit an excess amount. The most that such systems require of the driver is that a receipt be given for any excess amount deposited in which case the passenger can obtain a refund at some specified location.

Since the driver does not carry any cash for change and is not authorized to personally accept any fares, the temptation to rob the driver is removed. It is, however, desirable to provide a collection system which is otherwise characterized by efficient operation and which includes mechanisms and a mode of operation which will discourage pilfering and schemes for cheating the system.

It is a general object of this invention to provide a system for collecting fares and the like which is characterized by a highly efficient mode of operation and which employs mechanisms which substantially eliminate pilfering and cheating.

It is a more specific object of this invention to provide a system which is particularly suitable for "exact fare" collections.

It is a still further object of this invention to provide mechanisms for a fare collection system which are characterized by various safety features and which can be produced with substantial structural strength so that robbery or cheating of the constructions can be virtually eliminated.

These and other objects of this invention will appear hereinafter and for purposes of illustration, but not of limitation, specific embodiments of the invention are shown in the accompanying drawings in which:

FIG. 21 is an enlarged fragmentary sectional view illustrating the cash box in the engaged position relative to the receptacle inner wall;

FIG. 22 is a fragmentary sectional view taken about the line 22—22 of FIG. 21;

FIG. 23 is a fragmentary sectional view taken about the line 23—23 of FIG. 22;

FIG. 24 is a fragmentary sectional view illustrating a different position for the elements of FIG. 23;

GENERAL FAREBOX OPERATIONS

Figure 1:
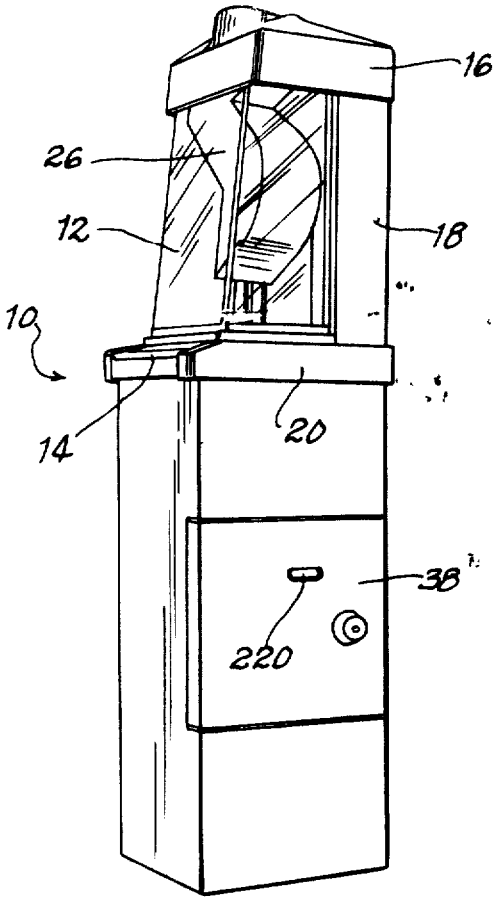
FIG. 1 is a perspective view of a fare box which incorporates various features of the invention.
Figure 2:
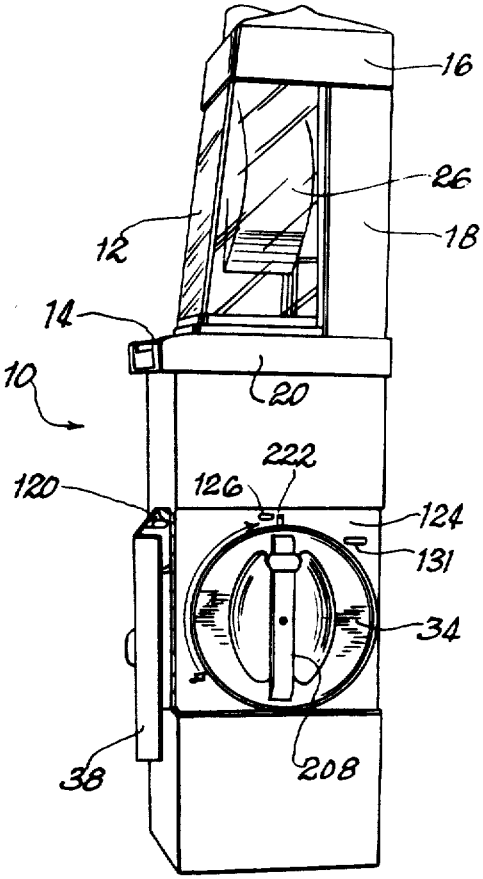
FIG. 2 is a perspective view of the farebox showing the cash box access door in the open position.

The farebox 10 is designed to be positioned at a fare collection location. Where the system is to be used in conjunction with a bus line, the farebox 10 is mounted on the bus floor and can be braced to the instrument panel bulkhead if required. The farebox is positioned with the driver of the vehicle in mind. Thus, the driver must be able to see through the window 12 of the box for purposes of viewing the money deposited. In addition, a trip bar 14 must be readily accessible to the driver when he is sitting in his normal position for driving the bus.

The farebox includes a top cover 16 which is primarily supported by the U-shaped side wall and back wall section 18. The transparent window 12 is preferably a one-piece U-shaped section which is confined between the cover 16, the wall section 18 and an intermediate frame portion 20.

The cover 16 defines a funnel-shaped area 22 which terminates in a fare slot 24. This slot is dimensioned to receive both coins and folding money. All of the fares deposited are directed through a baffle section 26 which is suspended from the cover 16.

The fares which pass through the baffle 26 are collected on an inspection plate 28 which is clearly visible through the window 12. When the operator is satisfied that a proper deposit has been made, the trip bar 14 is pushed down whereby the fare will be dumped into a second baffle section 30.

Figure 5:
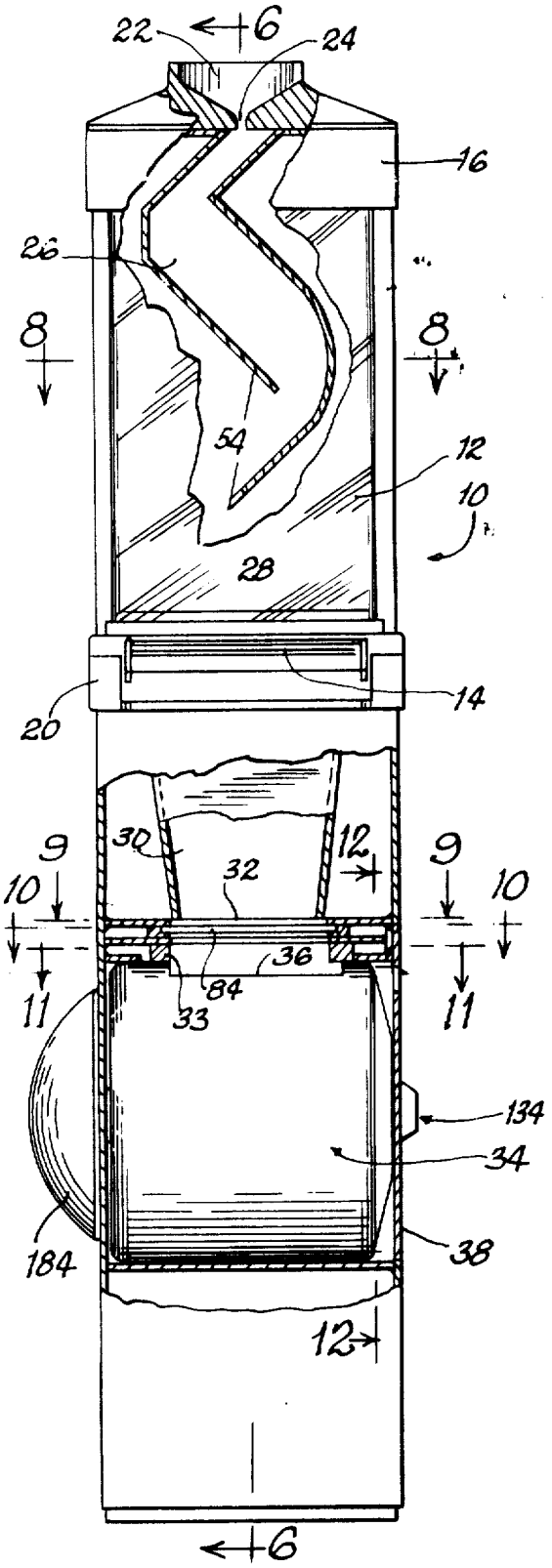
FIG. 5 is an elevational view, partly cut away, of the farebox.
Figure 6:
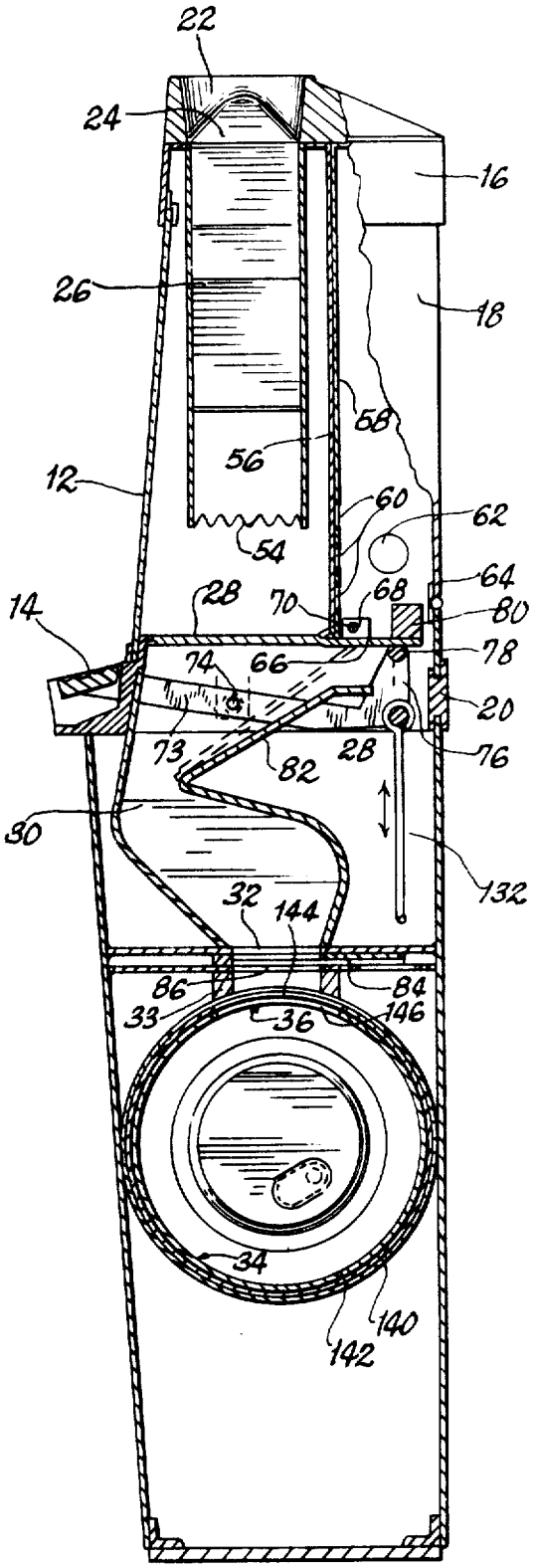
FIG. 6 is a vertical sectional view of the farebox taken about the line 6—6 of FIG. 5.
Figure 7:
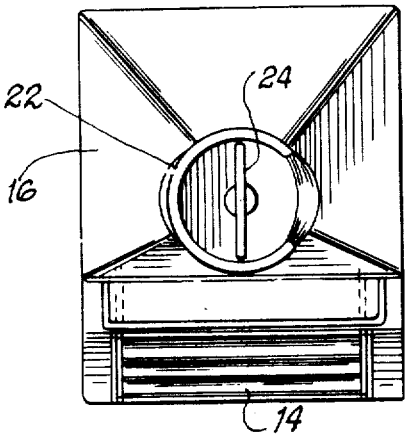
FIG. 7 is a top view of the farebox.
Figure 8:
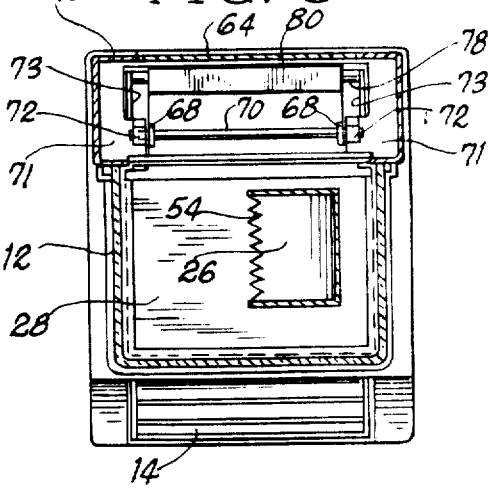
FIG. 8 is a horizontal sectional view of the farebox taken about the line 8—8 of FIG. 5.
Figure 9:
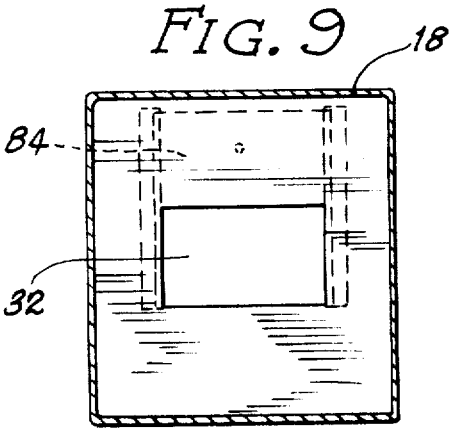
FIG. 9 is a horizontal sectional view of the farebox taken about the line 9—9 of FIG. 5.
Figure 10:
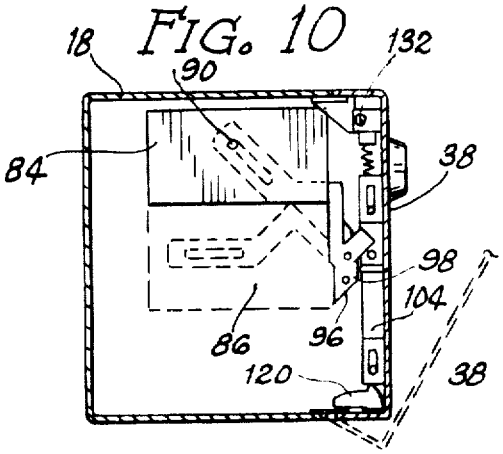
FIG. 10 is a horizontal sectional view of the farebox taken about the line 10—10 of FIG. 5.
Figure 11:
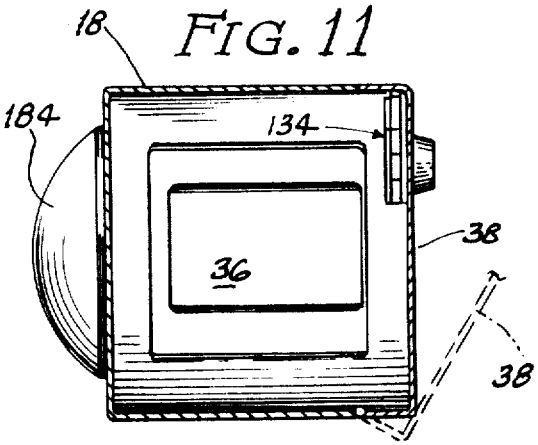
FIG. 11 is a horizontal sectional view of the farebox taken about the line 11—11 of FIG. 5.

The baffle section 30 extends from the inspection plate 28 to a discharge opening 32. Immediately beneath the opening 32, there is provided a cash box receptacle. As best shown in FIGS. 5 and 6, a cash box 34 is located in this receptacle when fares are being collected. The cash box defines an opening 36 which provides for direct passage of the fares through the baffle discharge opening 32, past baffle elements 33, and into the cash box.

GENERAL ACCEPTANCE VAULT OPERATION

The farebox 10 is provided with a door 38 which provides access to the cash box receptacle 40. When it is time to remove fares collected, the cash box is pulled out of the receptacle and taken to an acceptance vault of the type shown at 42 in FIGS. 28 and 29. This acceptance vault defines a cash box receptacle 44 which is dimensioned to receive the cash box 34.

When the cash box 34 is properly in place in the receptacle 44, the cash box is turned in the receptacle and the fares are dumped into an escrow cylinder 46. The cash box receptacle 44 defines an opening 48 which is brought into alignment with the opening 50 of the escrow cylinder 46 to achieve transfer of the fares into the escrow cylinder.

In order to remove the cash box, it must be rotated back to its original position, and in this case, the opening 50 of the escrow cylinder is rotated for dumping the fares into the main vault area 52. The vault may be provided with any suitable door which will maintain the fares in a secure state.

SPECIFIC DESCRIPTION

1. Fare Deposit and Inspection Means

As noted, the fares to be collected are inserted in the funnel-shaped section 22 of the top 16 and then fall through the slot 24. The baffle 26 defines a sinuous path which serves as the first blocking means insofar as pilfering is concerned. Thus, the walls of the baffle prevent any direct access between the slot 24 and the inspection plate 28. As a further precaution, the lower edge of the baffle 26 defines teeth 54 which, as is well known, will prevent any attempt to withdraw money, for example by means of a thin wire. For example, if a wire were inserted which speared a bill on the inspection plate 28, the teeth 54 would pull the bill off the wire before it could be withdrawn.

The intermediate wall in the upper portion of the farebox is preferably formed from a pair of sheets comprising an inner sheet 56 of translucent material and a backing sheet 58. The sheet 58 defines an opening 60, and two lights 62 are positioned behind this wall. This arrangement provides adequate light for the inspection plate 28. Access holes are preferably formed in the side wall of the section 18 to permit access for replacing lights. Buttons may be employed for covering the access holes.

The inspection plate 28 includes an extension 66 which carries a pair of upstanding ears 68 for supporting the rod 70. The ends of the rod are held by blocks 72 attached to plates 71 extending inwardly from the side portions of the wall section 18 whereby the rod 70 provides a pivot axis for the inspection plate 28.

The inspection plate 28 is pivoted when the trip bar 14 is pushed downwardly. The trip bar 14 is mounted on the arms 73 which are pivotally mounted on pins 74 adjacent the side walls of the farebox. The arms 73 each include an upwardly extending portion 76 which supports a transversely extending bar 78. The bar 78 engages the extension 66 of the plate 28 immediately beneath a counterweight 80 supported by the extension 66.

The weight of the movable portions associated with the inspection plate 28 and the trip bar 12 is carefully balanced relative to the axis defined by the rod 70 and the pins 74. Specifically, the weight of the counterweight 80 is preferably about 5 ounces in excess of the amount necessary to hold the system in perfect balance. With this arrangement, a normal fare or a bill on the inspection plate 28 will be insufficient to tip the plate. On the other hand, if fares are permitted to accumulate, which is considered undesirable under normal circumstances, then the inspection plate 28 will tip automatically when the weight of the fares exceeds approximately 5 ounces. The relatively delicate balance is also desirable since only a very mild application of force is required of the operator to push the bar 14 for removing fares from the plate 28.

The arms 73 associated with the trip bar 14 straddle the second baffle 30. The baffle defines an angularly directed wall 82 which serves to limit the tilt angle of the inspection plate 28. The plate 28 is also dimensioned so thta it will move freely between the arms 73.

2. Cash Box Collection

Fares are transferred through the opening 32 defined by the baffle 30, past the elements 33, and then into the cash box 34. The construction is provided with a gate 84 which, when open, permits passage of fares but is adapted to block the opening 32 to prevent unauthorized passage of fares through the opening when the door 38 is open. The gate is positioned beneath plate 85 which defines the opening 32. Blocks 87 define shoulders which support the plate during sliding movement.

As illustrated in FIGS. 13 through 17, the gate 84 is positioned on an arm 86 which defines slot 88 at one end. A pin 90 extends downwardly from the gate and is received by the slot 88. The pin 90 moves along the slot from one end to the other when the arm 86 is pivoted about the pin 92 at the opposite end of the arm.

A pair of short extensions 94 and 96 are formed integrally with the arm 86 in the area of the pin 92. A spring 98 has one end attached at 100 to the extension 96, and the other end attached at 102 to a sliding bar 104.

Figure 13:
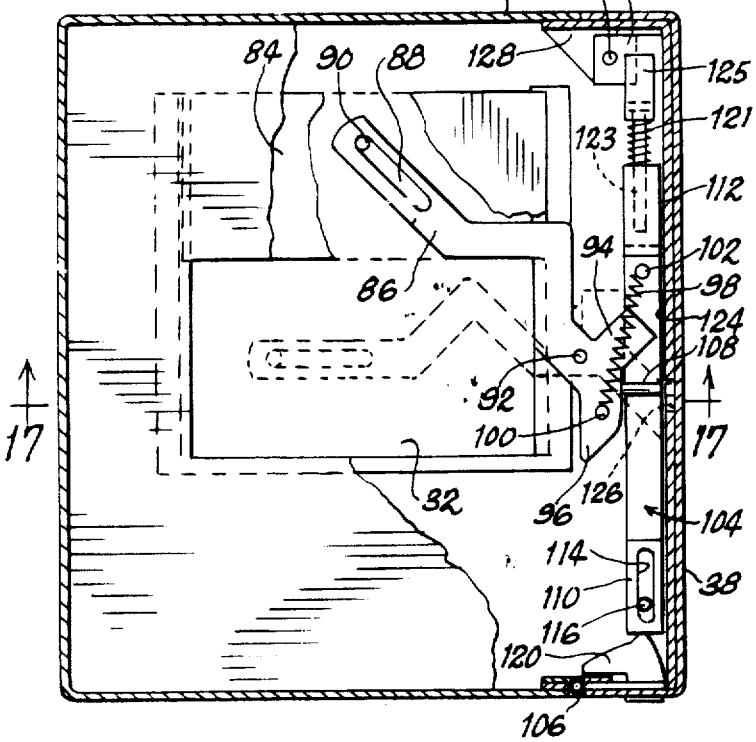
FIG. 13 is an enlarged horizontal sectional view of the farebox illustrating in detail the mechanisms shown in FIG. 10.
Figure 14:
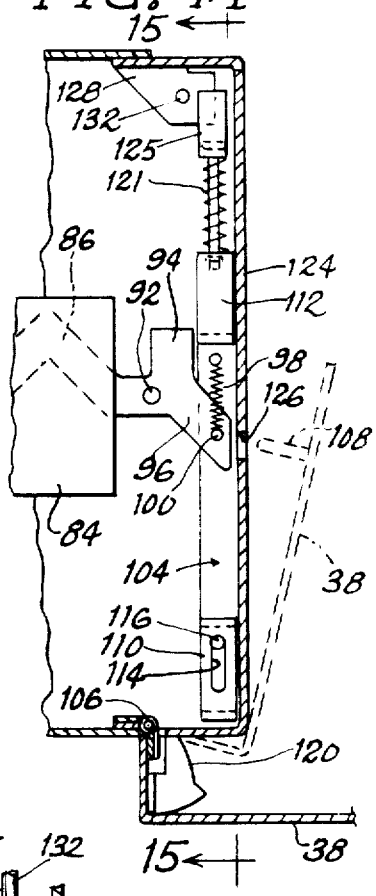
FIG. 14 is a fragmentary horizontal sectional view illustrating the mechanisms of FIG. 13 with the cash box access door in the open position.
Figure 15:
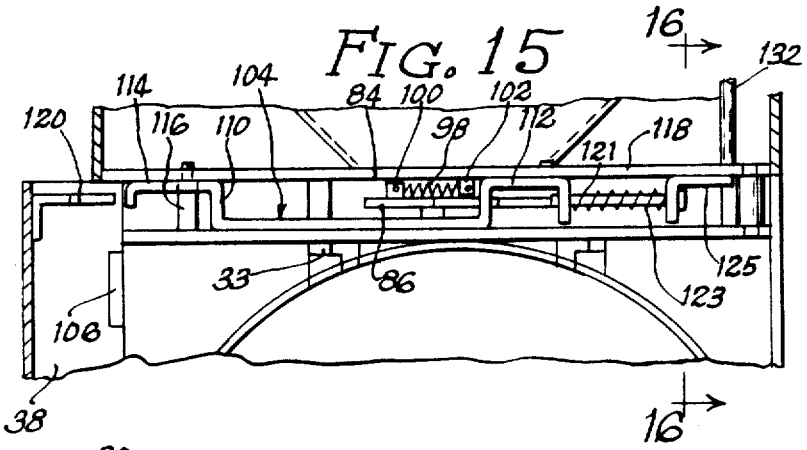
FIG. 15 is a fragmentary view taken about the line 15—15 of FIG. 14.

The access door 38 for the cash box 34 is pivotally attached by means of the hinge 106. This door carries an inwardly extending abutment element 108 which is aligned with the extension 96 of the arm 86. As best illustrated in FIGS. 13 and 14, the abutment member 108 engages the extension 96 as the door 38 moves to the closed position. The abutment operates to force the arm 86 to the position shown in FIG. 13 when the door is completely closed. This places the gate 84 to the side of the opening 32 thereby clearing a path for fares deposited. When the door 38 is opened, the spring 98 operates to shift the gate 84 back to the blocking position. It will be noted that this shifting movement occurs as soon as the door 38 is opened a slight amount.

The sliding bar 104 defines a pair of upstanding portions 110 and 112. The portion 110 defines a slot 114 which receives a pin guide 116. The door 38 carries a cam 120 which is adapted to engage the upstanding portion 110 on the sliding bar. As the door moves from an open to a closed position, the cam moves the bar in opposition to the spring 98. A second spring 121 is fit around pin 123 which is attached between upstanding portion 112 of the sliding bar and member 125. This spring also resists sliding movement of the bar during closing of the door and, therefore, assists in imparting return sliding movement to the bar when the door is opened.

The sliding movement imparted to the bar enhances the spring action which moves the gate 84 to the blocking position. Thus, as shown in FIG. 13, the spring 98 extended by the bar 104 when the door is closed. Accordingly, a strong spring action is provided for rapidly closing the gate 84 when the door is opened.

Figure 4:
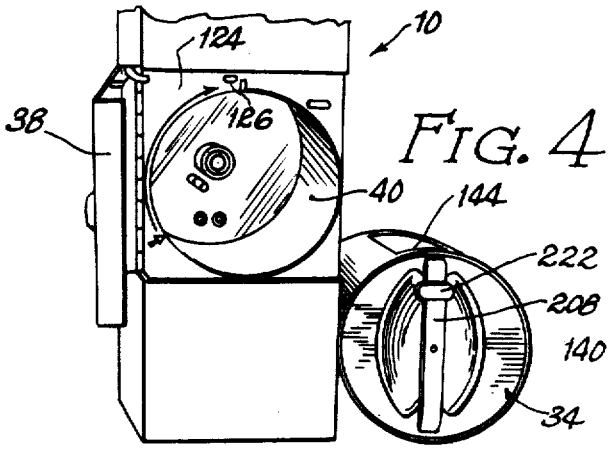
FIG. 4 is a fragmentary perspective view of the farebox illustrating the cash box receptacle with the cash box located adjacent the farebox.

The upstanding portion 112 of the bar also serves as a blocking means relative to the extension 94 provided on the gate arm 86. Thus, as shown in FIG. 14, when the door is open, the extension 94 is blocked by the upstanding portion 112 so that the gate cannot be opened when the door is open. In this connection, the sliding bar is not accessible when the door is open since as shown in FIG. 4, an interior wall 124 is located behind the door 38. An opening 126 is defined by the interior wall for entry of the abutment member 108. This security feature is desirable since it prevents access to the area above the cash box receptacle. If this access were available, an attempt might be made to block the passage of fares into the cash box by means which would not be visible when the door 38 is open.

Figure 16:
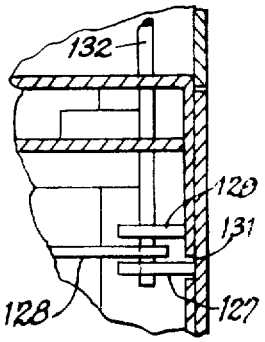
FIG. 16 is a fragmentary sectional view taken about the line 16—16 of FIG. 15.
Figure 17:
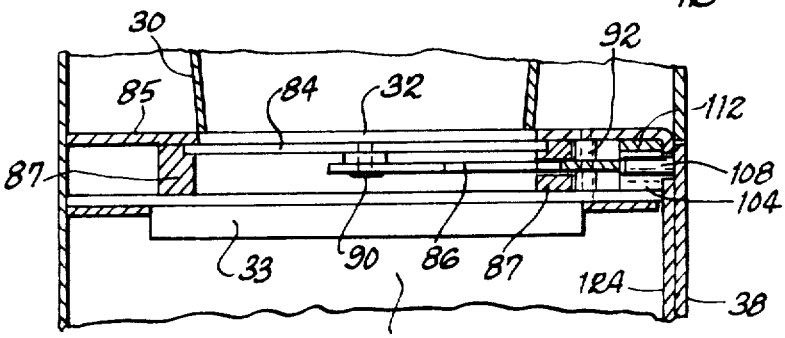
FIG. 17 is a fragmentary sectional view taken about the line 17—17 of FIG. 13.

The door 38 also carries a plate member 127, and a secondplate member 129 is mounted on the wall 124. An opening 131 is defined in the wall 124 to receive the member 127 when the door is closed. These plate members are adapted to straddle the plate member 128 which is secured to the side wall 130. Each of these plate members defines an opening adapted to receive a vertically extending lock rod 132. The rod 132 extends upwardly to a connection with the portion 76 of the trip bar arm 72. As shown in FIG. 16, when the door 38 is closed the lock rod 132 extends through the openings in the plate members so that the door will not open even after the door lock has been opened. The door will only open when the trip bar 14 is pushed down thereby lifting the lock rod and releasing the rod from engagement with the plate members. This feature insures that all fares on the inspection plate 28 have passed through before the door is opened. It will be noted that even if the door is opened rapidly to prevent such fares from falling all the way into the cash box, closing and locking of the gate 84 will prevent access to these fares.

Figure 12:
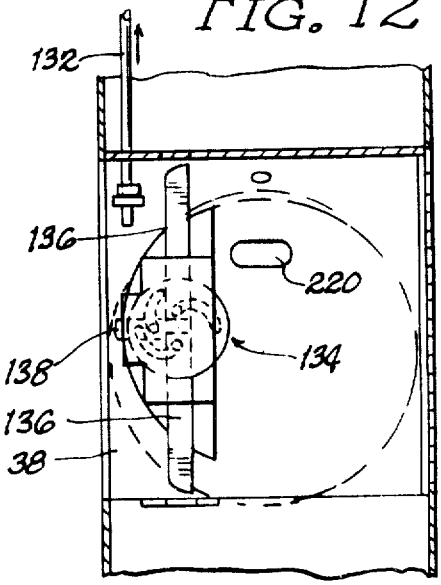
FIG. 12 is a fragmentary vertical sectional view of the farebox taken about the line 12—12 of FIG. 5.

The door 38 is provided with a lock structure generally designated 134 (FIG. 12). When an appropriate key is inserted in the lock, the vertically extending bolts 136 are withdrawn from slots provided in the housing. A laterally extending bolt 138 is simultaneously withdrawn from a similar slot. The preferred structure thus consists of a maximum security three-bolt lock although locks of other conventional types could be employed.

3. The Cash Box

Figure 25:
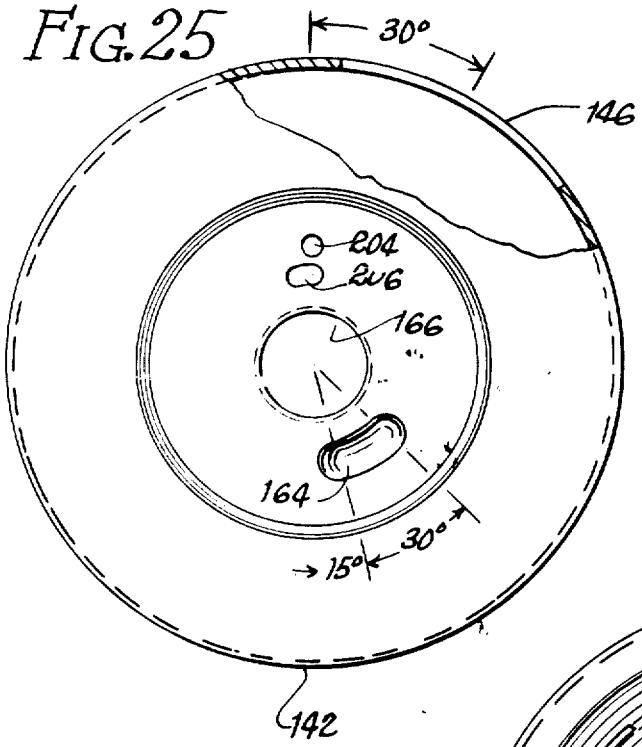
FIG. 25 is a bottom view, partly cut away, illustrating the inner seal portion of the cash box.

As noted, collection of the fares involves passages of the fares through the opening generally designated 36 in the cash box 34. The cash box actually consists of a pair of shells comprising an outer shell 140 (FIG. 27) and an inner shell 142 (FIG. 25). The shell 140 defines an opening 144 and the shell 142, an opening 146. When these openings are aligned, they provide the passage 36 referred to. Accordingly, the basic structure of the cash box follows the concepts described in Sollenberger U.S. Pat. No. 2,815,166.

Figure 18:
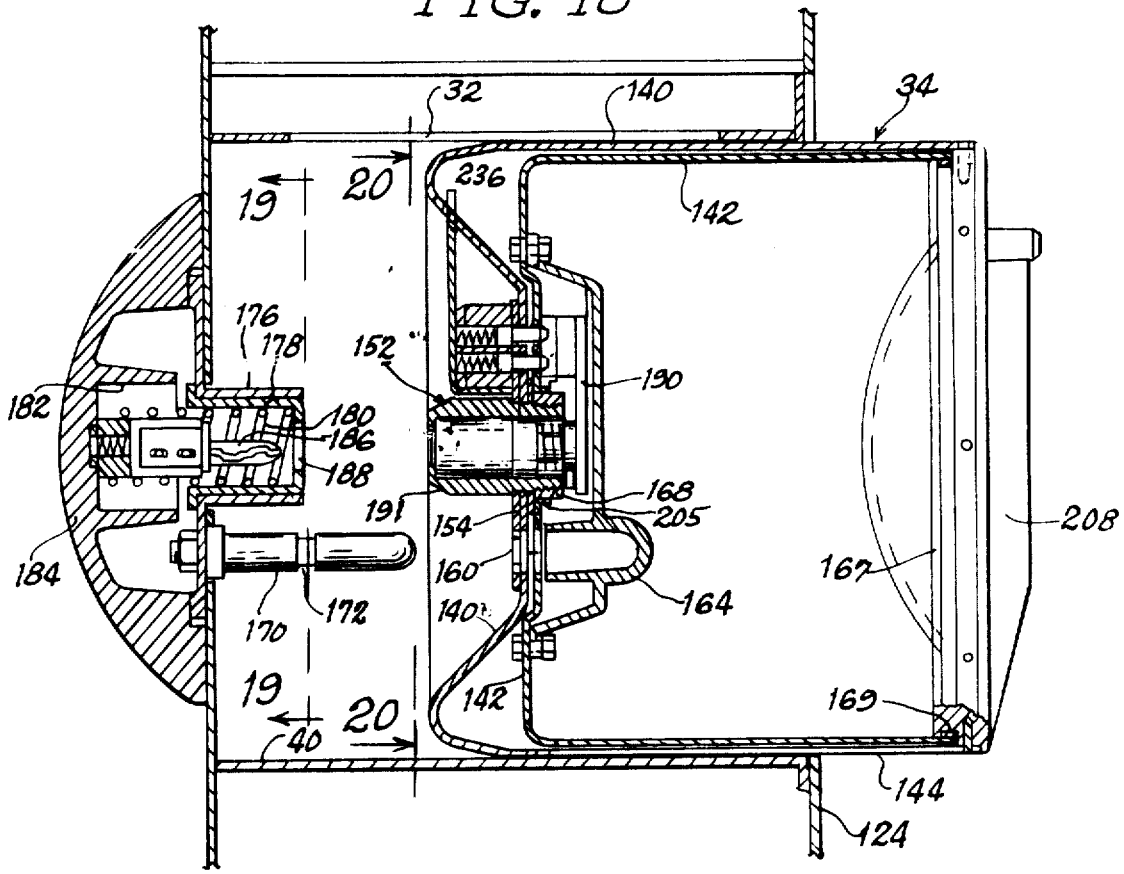
FIG. 18 is a fragmentary vertical sectional view of the farebox taken through the center of the cash box receptacle with the cash box being shown in the partially removed position.
Figure 19:
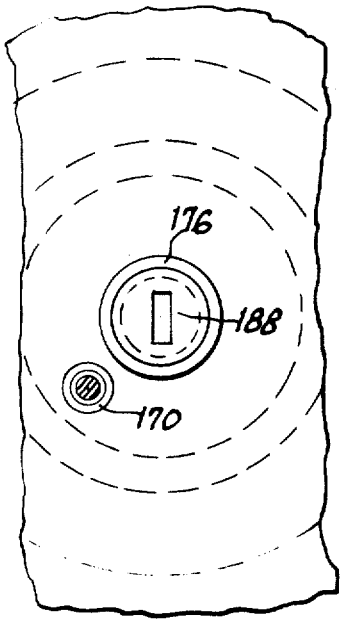
FIG. 19 is a fragmentary sectional view taken about the line 19—19 of FIG. 18.
Figure 20:
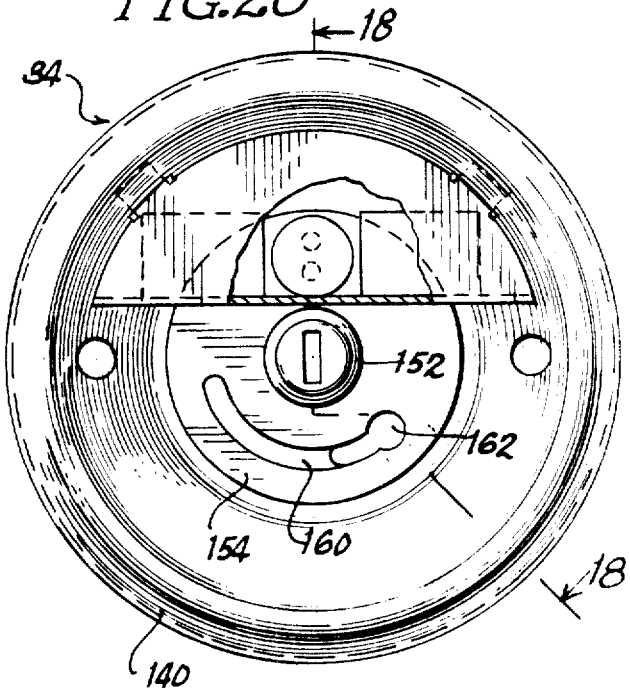
FIG. 20 is a bottom view of the cash box taken about the line 20—20 of FIG. 18.

The outer shell 140 defines a first arcuate slot 148 in its bottom wall. This slot extends for 120°. A central opening 150 is provided for receiving a lock 152 (FIGS. 18 and 21).

Figure 26:
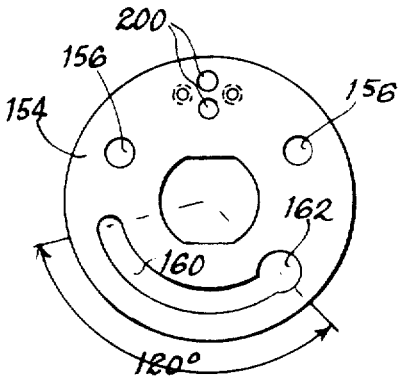
FIG. 26 is a detail view of a wear plate utilized in the cash box.

The plate 154 shown in FIG. 26 is adapted to be attached to the bottom wall of the outer shell 140 by extending appropriate fasteners through the aligned openings 156 in the plate and 158 in the outer shell. An arcuate slot 160 on the plate is coextensive with the slot 148; however, only the end portion 162 of the slot 160 is of the same width, the remainder of the slot being narrower.

The inner shell 142 is dimensioned to be received within the outer shell. The inner shell defines a short arcuate cavity 164 which is coextensive with one end of the slot 148. When the shells are assembled, the lock 152 extends through the central opening 166 of the inner shell. With the lock 152 in place, a threaded collar 168 is tightened around the end of the lock to thereby hold the assembly of the plate 154 and outer shell 140 together (FIG. 21). The inner shell 142 is captivated between the outer shell and handle cover 167. A bearing 169 is carried by the cover and engages the inner surface of the inner shell.

Figure 27:
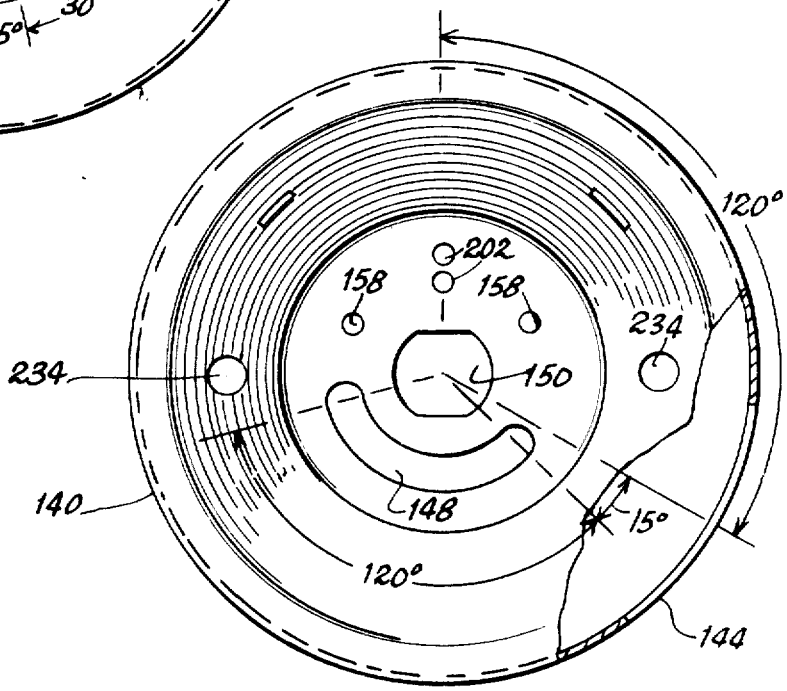
FIG. 27 is a bottom view of the outer shell portion of the cash box.

When the cash box 34 is outside the construction, the openings 144 and 146 are maintained in the relationship illustrated in FIGS. 25 and 27. Thus, the center of the opening 146 is offset 30° from the vertical while the center of the opening 144 is offset 120° from the vertical. This orientation is maintained when the assembly is inserted into the cash box receptacle 40. The cash box receptacle is provided with a pin 170 which defines a necked down central portion 172. This pin is positioned so that the enlarged end 162 of the slot 160 will be aligned with the pin when the cash box is properly inserted. The pin diameter is such that it will pass through the opening 162 but not through the narrower portion of the slot 160.

When the cash box is properly inserted, the pin 170 will pass through the slot 148 of the outer shell 140 and then be received in the cavity 164 of the inner shell. The necked down portion 172 is then aligned with the slot 160. As will be explained, relative movement between the pin 170 and the slot is required, and the provision of the narrower slot 160 and the necked down portion 172 insures that the cash box be fully inserted before such relative movement can occur.

The receptacle 40 is also provided with a cylindrical projecting portion 176 which receives a cylindrical cap 178. A spring 180 normally holds the cap in the extended position shown; however, a chamber 182 is provided in the block 184 to permit displacement of the cap 178. A key 186 is held within the cap 178, and a slot 188 is provided so that the key will project outwardly when the cap is depressed. The cap 178 provides a cover for the key to restrict entry for making a wax impression and to prevent breaking of the key.

As shown in FIG. 21, the housing of the lock 152 engages the cap when the cash box is inserted so that the key 186 will enter the lock. The lock must be open in order to achieve the relative movement to be described and, accordingly, only a cash box which has a lock suitable for the specific key can be utilized in any given construction. This provides still further security since it significantly reduces the possibility of anyone inserting an unauthorized cash box into the construction. With the proper cash box inserted, the lock barrel 191 is free for movement relative to the lock bolt 190 which is secured to the lock plug 193. A cam 192 is attached to the end of the bolt 190, and this cam is provided for depressing a pair of pins 194. These pins are normally held in the position shown in FIG. 21 by means of springs 196. A bracket 198 is attached to the plate 154 for holding the assembly of the springs and pins. As shown in FIGS. 26 and 27, openings 200 are provided in the plate 154 for receiving the pins, and corresponding openings 202 are provided in the outer shell 140. The inner shell 142 includes a corresponding opening 204 and a short slot 206 which receives the pins.

Figure 3:
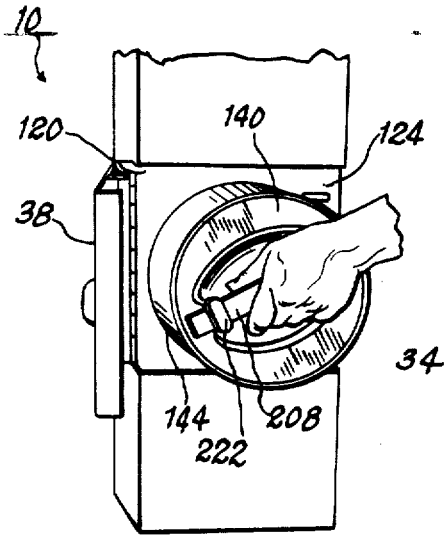
FIG. 3 is a fragmentary perspective view of the farebox illustrating the cash box in the partially removed position.

The cash box 34 is inserted in the cash box receptacle 40 in the position shown in FIG. 3. In this position, the opening 144 defined by the outer shell 140 is located left of center and is offset 120° from the vertical. The opening 146 in the inner shell 142 is also positioned left of center and is offset 30° from the vertical.

To place the cash box in position for receiving fares, it is rotated clockwise by means of a handle 208. It will be apparent that when the outer shell has been rotated through 120°, the opening 144 in this shell will be positioned immediately beneath the opening 32 defined at the bottom of the baffle 30.

The opening 146 in the inner shell is brought into alignment by limiting rotation of the inner shell to 30°. As best shown in FIG. 21, the lock housing 191 is tied to the outer shell 140 and the associated plate 154. Accordingly, the housing 191 will rotate when the operator turns the handle 208. The lock plug 193 and the associated cam 192 will remain stationary. The inner shell 142 includes a flange 204 which engages the surface 207 defined by the collar 168. This provides a bearing surface permitting rotation of the inner shell relative to the lock barrel 191.

The pins 194 will rotate with the plate 154, and the inner shell 142 will move due to engagement of the pins with the shell through the openings 204 and 206. As the movement progresses, however, the cam 192 operates to drive the pins 194 upwardly in opposition to the springs 196. Because of the beveled ends of the pins, they are eventually forced out of the openings 204 and 206 at which time driving engagement with the inner shell is removed. The cam 192 is positioned so that this driving engagement will be removed after the inner shell has rotated through 30°. Continued rotation of the outer shell through an additional 90° then brings the openings 144 and 146 into alignment.

Rotation of the plate 154 locates the narrow portion of the slot 160 around the pin 170. Accordingly, the cash box 34 cannot be withdrawn until the cash box is rotated back to its original position. It is, therefore, not possible to remove the cash box when the openings 144 and 146 are in alignment.

The slot 206 extends for about 10°, and the provision of this slot insures that at least one of the pins will move to locking position when the cash box is rotated to its original position. This safety feature is particularly important after extensive use of a cash box which can result in the wear of parts to the extent that the cash box could be removed without rotation sufficient to allow a pin 194 to move into the opening 204.

After the cash box 34 has been located in the receptacle 40, the door 38 is closed and locked. The door defines an opening 220 which is aligned with a boss 222 formed on the cash box handle 208. The boss may be provided with an identifying code. This arrangement is desirable for spot check inspection of vehicles. An inspector can readily determine whether a proper cash box is located in the farebox without opening the door 38. In this way, the inspector need not identify himself which is desirable if there is a suspicion of cheating on the part of the vehicle driver.

4. The Vault

In the preferred practice of the system of the invention, vehicles carrying fareboxes are driven to a collection location where a vault 42 of the type shown in FIGS. 28 through 31 is located. At this station, an attendant will open the door 38 and remove the cash box 34 by rotating the cash box counterclockwise to the position shown in FIG. 3 and then pulling the cash box out of the receptacle 40. The cash box is then inserted in the receptacle 44 of the vault 42.

The bottom wall of the receptacle 44 *defines a slot (FIG. 29) receiving stationary* [carries a] pin 230 which is adapted to be received in the same manner as the pin 170. Thus, the end of the pin will pass through the enlarged opening 162 in the slot 160, then through the slot 148 and into the cavity 164.

A pair of additional aligning pins 232 are also located on the end wall of the receptacle 44. These pins are positioned for entry through the openings 234 defined by the outer cash box shell 140. It will be noted that the end wall 236 of the inner shell 142 is spaced from the end wall in the outer shell to provide room for receiving the pins 232. Thus, these pins do not extend through the wall 236 of the inner shell.

Figure 28:
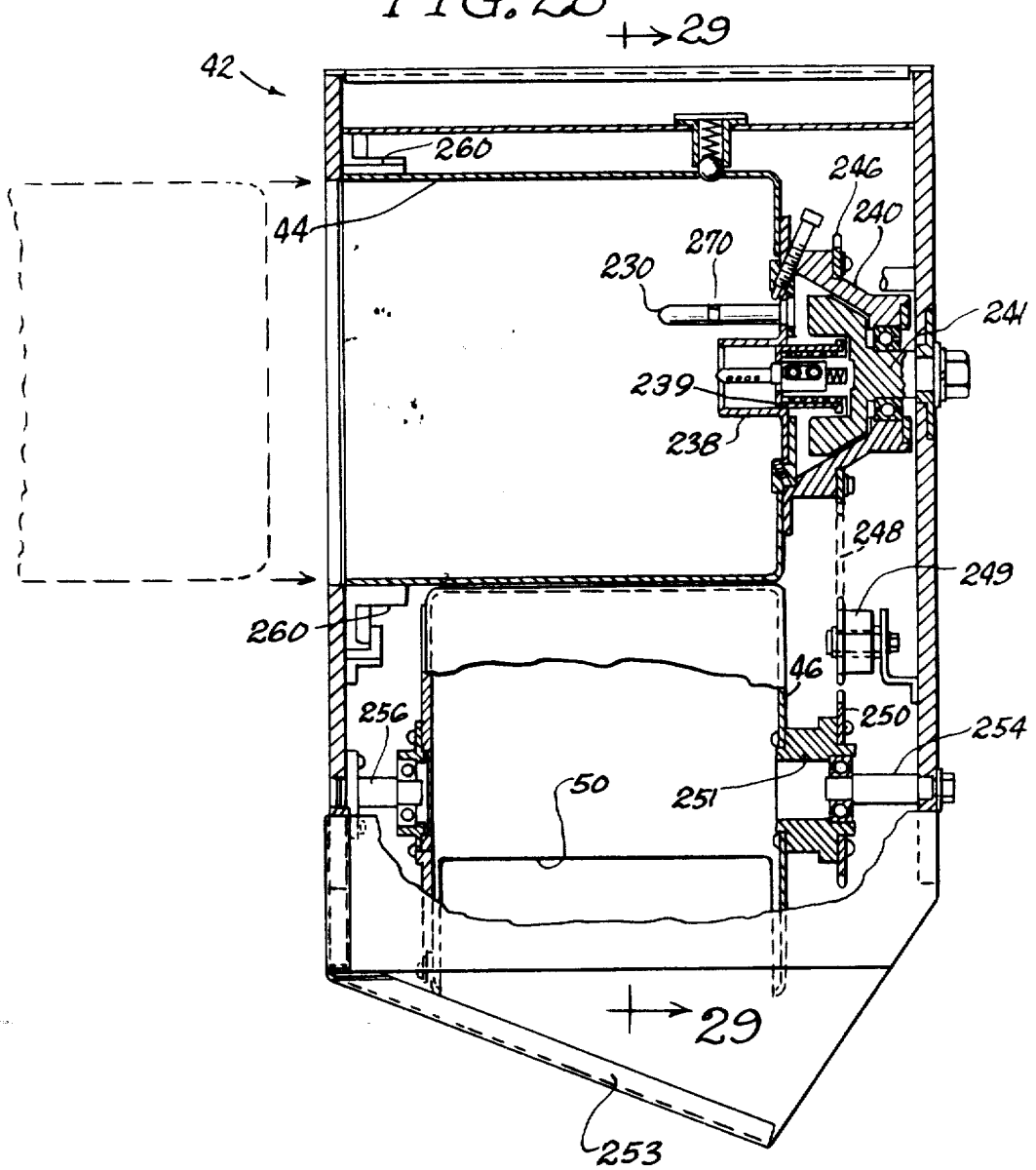
FIG. 28 is a vertical sectional view illustrating the cash box prior to entry into the cash box acceptance receptacle.
Figure 29:
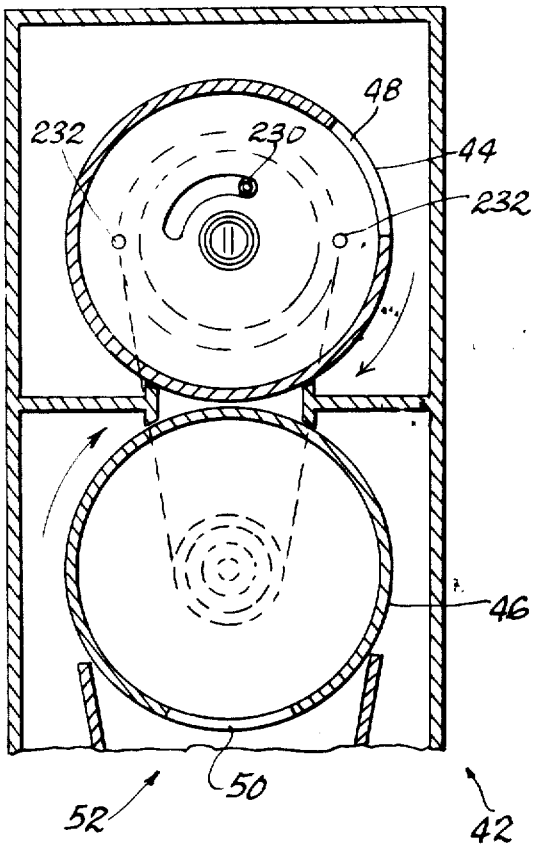
FIG. 29 is a cross-sectional view of the acceptance receptacle taken about the line 29—29 of FIG. 28.
Figure 30:
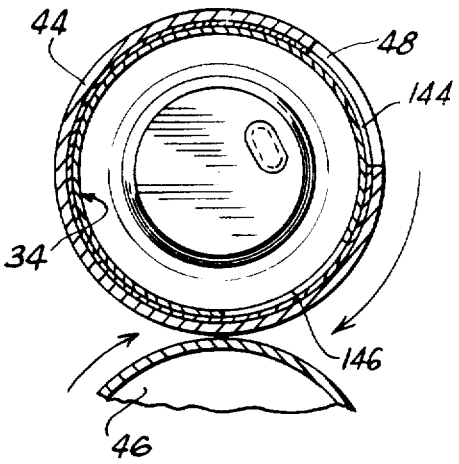
FIG. 30 is a fragmentary sectional view illustrating the cash box in place in the acceptance receptacle; and, FIG. 31 is a fragmentary sectional view illustrating the cash box in the discharge position in the acceptance receptacle.

The end wall of the receptacle 44 also carries a cylindrical housing 238 for a key. The key in the housing 238 is a master key so that several cash boxes with different tumbler arrangements can be employed. The arrangement within the cylindrical housing 238 is otherwise the same as the arrangement within the housing 176 in the farebox construction. The cylindrical cap 239 in FIG. 28 is shown in the forced-in position.

Figure 31:
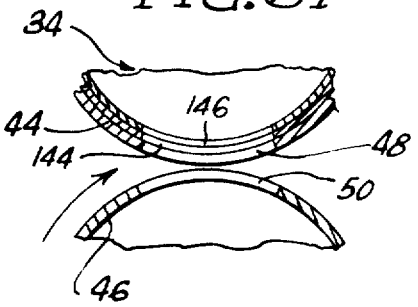

The cash box 34 is inserted in the vault, so that the opening 144 in the outer shell is positioned at the upper right, when viewed from the front of the vault, 60° offset from the vertical. The opening 48 in the receptacle will thus be lined up with the opening 144 while the opening 146 in the inner shell is positioned at the lower right, 30° offset from the vertical. Accordingly, when the cash box is rotated 120° clockwise by means of the handle 208, the outer shell and the cylinder 44 will move together to a position facing downwardly. By the same mechanisms previously described, the opening 146 will move through 30° so that all the openings will be aligned as shown in FIG. 31.

An annular member 240 is supported for rotation around a shaft 241. A sprocket gear 246 is mounted on the annular member 240, and a chain 248 extends from this sprocket past idler sprocket 249 to sprocket 250. The sprocket 250 is mounted on an annular member 251 which is rotatably supported on shaft 254. The cylindrical receptacle 46 defining an opening 50 is supported at one end on the annular member 251. The other end of the receptacle 46 is supported for rotation about shaft 256.

The sprockets 246 and 250 are selected so that the opening 50 in the cylinder 46 will move into position beneath the aligned openings 48, 144 and 146 when the latter openings are facing downwardly. In the embodiment illustrated, a 3:2 ratio is provided so that the cylinder 44 rotates 120° while the cylinder 46 rotates 180°.

All of the fares in the cash box 34 will be transferred to the cylinder 46 when the described action occurs. The pin 230 defines a necked down portion 270 which operates in the same manner as the necked down portion 172 of the pin 170. Thus, the cash box 34 cannot be removed from the vault receptacle until the cash box is rotated back to its original position. This return rotation moves the cylinder 46 back to its original position so that access to the cylinder 46 is never available. The bottom of the vault structure may be designed for retaining the fares. On the other hand, the structure illustrated may be employed simply for transferring the fares into a vault or other storage means by means of the chute 253.

The use of the vault arrangement described provides a still further safeguard against pilfering. Thus, the cylinder 46 provides an escrow arrangement which cuts off access to the vault interior. When considering the entire system, it will be apparent that the fares are completely protected against pilfering from the time they are deposited by a passenger until the time they are placed in an accumulation area of a vault.

The system is thus designed with consideration of various pilfering and cheating techniques in mind from the time a fare is inserted to the time the fare is safely confined in a vault. The arrangements described provide maximum security while also being characterized by highly efficient operating components thereby making the system relatively economical while keeping maintenance expense to a minimum.

It will be understood that various changes and modifications may be made in the construction which provide the characteristics of this invention without departing from the spirit thereof.

That which is claimed is:

1. In a construction for collecting fares and the like comprising a fare deposit section, an inspection surface defined in said deposit section for temporarily holding fares deposited, manually operable means for dumping fares from said inspection surface into a cash box area, a cash box receptacle defined in said cash box area, and a removable cash box adapted to be received in said receptacle, said cash box defining an access opening, closure means in said cash box for blocking said access opening for preventing access to the interior of the cash box, means normally locking said closure means against movement relative to said access opening, means defined by said receptacle operating to unlock said closure means upon insertion of said cash box into said receptacle and to thereby permit rotation of said cash box relative to the receptacle to locate the cash box in position such that the access opening will receive fares dumped from said inspection surface, means for locking said cash box in place in the receptacle upon rotation away from its inserted position and toward said receiving position, and wherein said closure means is automatically closed during rotation of the cash box back to said inserted position and prior to removal of the cash box from the receptacle.

2. A construction in accordance with claim 1 including a door for said receptacle and a viewing opening in said door for determining the presence of a cash box in the receptacle.

3. A construction in accordance with claim 2 wherein said cash box is formed of inner and outer shells with each shell defining an opening, said cash box being rotated upon insertion into said receptacle to achieve alignment of the openings in the cash box shells while positioning the openings for receiving fares dumped from the inspection surface.

4. A construction in accordance with claim 3 including spring loaded pin means mounted on one of said shells, openings defined by the shells for receiving said pin means whereby the pin means operate to tie the shells together during rotary movement of the shells, and including cam means associated with the cash box for displacing said pin means out of engagement with one of said shells when the access opening for said one shell is in position for receiving fares, and means for holding said one shell in position during continued rotation of the other shell to bring the access opening of the other shell into alignment with the access opening of said one shell.

5. A construction in accordance with claim 4 including a key positioned in the end wall of said receptacle, a lock mounted on said cash box, said other shell being secured to the barrel of said lock and said cam being secured to the plug of said lock, insertion of said cash box into said receptacle providing for entry of said key into said lock to free said barrel for rotary movement relative to said plug.

6. A construction in accordance with claim 3 including a key positioned in the end wall of said receptacle, a lock mounted on the end wall of said cash box said lock having a lock plug and a lock barrel normally tied to the plug, said outer shell being tied to the lock barrel with said lock plug being held stationary by said key, said outer shell being provided with a handle to acomplish rotation of said cash box, and said lock preventing such rotation unless the proper key is inserted in the lock to free the lock barrel for movement relative to the lock plug.

7. A construction in accordance with claim 6 wherein said key is confined within a spring mounted cylinder which normally surrounds the key, the housing of said lock being adapted to engage said cylinder when said cash box is inserted in the receptacle to depress the cylinder and to expose said key for insertion in the lock.

8. A construction in accordance with claim 1 wherein said cash box is formed of inner and outer shells with each shell defining an opening, the respective openings being movable into alignment upon relative rotation of said inner and outer shells, and including a lock normally preventing relative rotation of said inner and outer shells.

9. A construction in accordance with claim 8 including a vault for collecting fares from a plurality of cash boxes, said vault defining a cash box receptacle, a key mounted within said receptacle for engagement with the lock of each cash box to thereby permit relative rotation of the cash box shells for aligning the openings of the shells, and means associated with said vault for achieving relative movement of said shells for discharge of fares in the cash box through the aligned openings of the shells into the interior of the vault.

10. A construction in accordance with claim 9 including lock means located in said vault receptacle and movable into engagement with the cash box when said access opening is positioned for discharging fares, said locking means preventing removal of the cash box from the vault receptacle until relative movement of the cash box in the vault receptacle sufficient to close said closure means has taken place.

11. A construction in accordance with claim 9 wherein the vault receptacle comprises a first rotatably mounted cylinder, a second rotatably mounted cylinder positioned adjacent said first cylinder, an opening defined in the walls of each of said cylinders, said cash box, when inserted in said first cylinder, being tied to said cylinder whereby rotation of said cash box rotates said first cylinder to locate the opening defined by said first cylinder in a discharge position, and including drive means tying said second cylinder to said first cylinder whereby said second cylinder rotates with said first cylinder for positioning the opening in said second cylinder in alignment with the opening in said first cylinder, said opening in said cash box being aligned with said cylinder openings whereby said fares will be discharged from said cash box into said second cylinder.

12. A construction in accordance with claim 11 wherein said cash box must be rotated back to its original position to remove the cash box from said first cylinder, the return rotation of the cash box resulting in movement of said second cylinder to a discharge position whereby the fares collected by said second cylinder are discharged into the interior of said vault.

13. A construction in accordance with claim 11 including spring loaded pin means mounted on one of said shells, openings defined by the shells for receiving said pin means whereby the pin means operate to tie the shells together during rotary movement of the shells, and including cam means associated with the cash box for displacing said pin means out of engagement with one of said shells when the access opening for said one shell is in position for receiving fares, and means for holding said one shell in position during continued rotation of the other shell to bring the access opening of the other shell into alignment with the access opening of said one shell.

14. A construction in accordance with claim 13 wherein said other shell is secured to the barrel of said lock and said cam is secured to the plug of said lock, insertion of said cash box into said vault receptacle providing for entry of said key into said lock to free said barrel for rotary movement relative to said plug.

15. A construction for collectiong fares and the like comprising a deposit section, an inspection surface in said deposit section for temporarily holding fares deposited, manually operable means for dumping fares from said inspection surface into a cash box area, and a cash for receiving said fares, a sliding gate interposed between said inspection area and said cash box adapted to block access of the fares to said cash box, a door in said construction providing access for inserting and removing the cash box, and means associated with said door operably connected to said gate whereby the gate automatically closes when said door is opened.

16. A construction in accordance with claim 15 wherein said gate is attached to a pivotally mounted arm, abutment means attached to said door and engaging said arm, and spring means attached to said arm urging said arm to a position for closing said gate, said abutment means being removed from engagement from said arm when said door is only slightly opened whereby said spring means operates to rapidly move the gate to blocking position before the door is fully opened.

17. A construction in accordance with claim 16 including a sliding bar defining a blocking portion adapted to engage said arm, cam means associated with said door for engaging said sliding bar to move the blocking portion of said bar out of blocking position relative to said arm when said door is closed, and spring means for urging said bar into a position whereby said blocking position engages said arm when the door is open, said blocking portion preventing movement of said arm and opening of said gate when said door is open.

18. A construction in accordance with claim 17 wherein the spring means attached to said arm has one end attached to said sliding bar.

19. A construction for collecting fares and the like comprising a deposit section, an inspection surface in said deposit section for temporarily holding fares deposited, manually operable means for dumping fares from said inspection surface into a cash box area, and a cash box located in said cash box area for receiving said fares, said manually operable means comprising a trip bar exposed on the exterior of said construction, a pivotally connected arm having said trip bar attached at one end, said inspection surface comprising a pivotally mounted member operatively connected to said arm, said fares being collected on one side of the pivot axis of said member, and wherein the weight of those portions of said member and said arm on one side of the pivot axis of said member and said arm only slightly exceeds the weight of said trip bar, and the portions of the arm and member on the other side of the pivot axes whereby only a light touch on the trip bar is required to tip said plate, and including a door in the cash box area of the construction to permit insertion and removal of said cash box, and locking means for said door, at least a portion of said locking means being connected to said member whereby said member must be in the tipped position before said door can be opened.

20. A construction in accordance with Claim 19 wherein said member comprises a normally horizontally mounted inspection plate, said locking means including a vertically extending rod attached to said *arm operatively connected to said* inspection plate, means attached to a stationary wall of said construction defining an opening for receiving said rod, and means attached to said door defining a corresponding opening whereby said rod is adapted to be received in said openings for locking said door and whereby said door will be unlocked when said rod is moved vertically upon *pivoting of said arm and* tipping of said inspection plate.

21. A construction in accordance with claim 19 wherein said deposit section includes a transparent wall portion to permit viewing of said inspection surface, a separate wall formed of a light transmitting material, and a light positioned behind said light transmitting wall to provide independent lighting for said inspecting surface.

22. In a system for collecting fares wherein the fares are deposited in a plurality of cash boxes situated at various locations with the cash boxes being thereafter brought to a common collection location, the improvement comprising a vault construction situated at said collection location, said vault construction defining a cash box receptacle, said cash box defining an access opening, closure means in said cash box for blocking said access opening to prevent access to the interior of the cash box, means defined by said receptacle operating to open said closure means during movement of the cash box relative to the receptacle in the course of locating the cash box in a position such that its access opening will discharge fares into said vault, and wherein said closure means is automatically closed in the course of movement of the cash box relative to the receptacle during removal of the cash box from the vault.

23. A construction in accordance with claim 22 including locking means located in said vault receptacle and movable into engagement with the cash box when said access opening is positioned for discharging fares, said locking means preventing removal of the cash box from the vault receptacle until relative movement of the cash box in the vault receptacle sufficient to close said closure means has taken place.

24. A construction in accordance with claim 22 wherein the vault receptacle comprises a first rotatably mounted cylinder, a second rotatably mounted cylinder positioned adjacent said first cylinder, an opening defined in the walls of each of said cylinders, said cash box, when inserted in said first cylinder, being tied to said cylinder whereby rotation of said cash box rotates said first cylinder to locate the opening defined by said first cylinder in a discharge position, and including drive means tying said second cylinder to said first cylinder whereby said second cylinder rotates with said first cylinder for positioning the opening in said second cylinder in alignment with the opening in said first cylinder, said opening in said cash box being aligned with said cylinder openings whereby said fares will be discharged from said cash box into said second cylinder.

25. A construction in accordance with claim 24 wherein said cash box must be rotated back to its original position to remove the cash box from said first cylinder, the return rotation of the cash box resulting in movement of said second cylinder to a discharge position whereby the fares collected by said second cylinder are discharged into the interior of said vault.

26. A construction in accordance with claim 24 wherein said cash box is formed of inner and outer shells with each shell defining an opening, said cash box being rotated upon insertion into said vault receptacle to achieve alignment of the opening for discharging fares into said second cylinder.

27. A construction in accordance with claim 26 including spring loaded pin means mounted on one of said shells, openings defined by the shells for receiving said pin means whereby the pin means operate to tie the shells together during rotary movement of the shells, and including cam means associated with the cash box for displacing said pin means out of engagement with one of said shells when the access opening for said one shell is in position for receiving fares, and means for holding said one shell in position during continued rotation of the other shell to bring the access opening of the other shell into alignment with the access opening of said one shell.

28. A construction in accordance with claim 27 including a key positioned in the end wall of said vault receptacle, a lock mounted on said cash box, said other shell being secured to the barrel of said lock and said cam being secured to the plug of said lock, insertion of said cash box into said vault receptacle providing for entry of said key into said to lock to free said barrel for rotary movement relative to said plug.

*29. Apparatus for collecting fares and the like comprising a fare deposit section, an inspection surface defined in said deposit section for temporarily holding fares deposited, manually operable means for dumping fares from said inspection surface into a cash box area, a cash box receptacle defined in said cash box area, and a removable cash box adapted to be received in said receptacle, said cash box defining an access opening, closure means in said cash box for blocking said access opening for preventing access to the interior of the cash box, the portion of said cash box defining said access opening being rotatable within said receptacle relative to the closure means of said cash box for movement of said access opening away from said closure means, means normally locking said portion of said cash box against movement relative to said closure means, means supported in said receptacle and engageable, upon insertion of said cash box into said receptacle, with said means normally locking said closure means, said means supported in said receptacle operating to permit rotation of said cash box portion within said receptacle for thereby locating the cash box in position such that the access opening will receive fares dumped from said inspection surface, means for locking said cash box in place in the receptacle upon rotation away from its inserted position and toward said receiving position, said closure means being automatically closed during rotation of the cash box back to said inserted position and prior to removal of the cash box from the receptacle.*

*30. Apparatus in accordance with Claim 29 including a vault for collecting fares from a plurality of cash boxes, said vault defining a cash box receptacle, means supported in said vault and engageable with said means normally locking said portion of said cash box against movement relative to said closure means, said cash box receptacle being rotatable within said vault, means tying said cash box receptacle to a cash box received within the receptacle, said means supported in said vault operating to free said cash box and said receptacle for rotation within the vault, and means restraining the degree of rotation of said closure means whereby rotation of the portion of said cash box defining said access opening removes the closure means of said cash box from blocking position relative to said access opening for discharge of fares in the cash box into the vault interior, and wherein said access opening is automatically closed by said closure means in the course of movement of the cash box relative to the vault during return rotation of the cash box and vault receptacle to a starting position.*

References Cited

The following references, cited by the Examiner, are of record in the patented file of this patent or the original patent.

UNITED STATES PATENTS

| | | | |
|---|---|---|---|
| 2,430,384 | 11/1947 | Broussard | 232—16 |
| 2,613,871 | 10/1952 | Broussard et al. | 232—16 |
| 2,815,166 | 12/1957 | Sollenberger | 232—16 |
| 2,884,188 | 4/1959 | Grant et al. | 232—7 |

JAMES C. MITCHELL, Primary Examiner

U.S. Cl. X.R.

232—16